United States Patent
Thomas et al.

(10) Patent No.: US 7,577,186 B2
(45) Date of Patent: Aug. 18, 2009

(54) INTERFERENCE MATRIX CONSTRUCTION

(75) Inventors: John K. Thomas, Erie, CO (US);
Anand P. Narayan, Boulder, CO (US);
Eric S. Olson, Boulder, CO (US)

(73) Assignee: TENSORCOMM, Inc, Greenwood Village, CO (US)

( * ) Notice: Subject to any disclaimer, the term of this patent is extended or adjusted under 35 U.S.C. 154(b) by 522 days.

(21) Appl. No.: 10/935,015

(22) Filed: Sep. 7, 2004

(65) Prior Publication Data

US 2005/0031060 A1 Feb. 10, 2005

Related U.S. Application Data

(63) Continuation-in-part of application No. 10/773,777, filed on Feb. 6, 2004, now Pat. No. 7,394,879, and a continuation-in-part of application No. 10/686,829, filed on Oct. 15, 2003, and a continuation-in-part of application No. 10/686,359, filed on Oct. 15, 2003, now Pat. No. 7,068,706, and a continuation-in-part of application No. 10/294,834, filed on Nov. 15, 2002, now Pat. No. 7,200,183, and a continuation-in-part of application No. 10/247,836, filed on Sep. 20, 2002, now Pat. No. 7,158,559.

(51) Int. Cl.
*H04B 1/00* (2006.01)

(52) U.S. Cl. ...................................................... 375/148

(58) Field of Classification Search ................ 375/285, 375/298, 346, 316, 218, 347, 229, 312; 702/196; 370/320, 335, 342
See application file for complete search history.

(56) References Cited

U.S. PATENT DOCUMENTS 3,742,201 A 6/1973 Groginsky (Continued)

FOREIGN PATENT DOCUMENTS

DE 4201439 A1 7/1993

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Sam K Ahn
(74) *Attorney, Agent, or Firm*—Anand P. Narayan

(57) ABSTRACT

The present invention provides systems and methods for interference matrix construction. Such an interference matrix may be used to generate a cancellation operator that when applied to a signal may substantially remove selected interfering signals. In one embodiment of the invention, a system comprises an interference selector configured for selecting one or more interferers for interference cancellation. The system also comprises a matrix generator communicatively coupled to the interference selector and configured for receiving selected interferers from the interference selector. The matrix generator is also configured for generating a matrix having one or more vectors, wherein each vector comprises elements of at least one of the selected interferers. Such an interference matrix and the subsequent generation of the cancellation operator may advantageously provide interference cancellation to systems employing CDMA (e.g., such as cdmaOne and cdma2000), WCDMA, Broadband CDMA, UMTS and GPS signals.

66 Claims, 9 Drawing Sheets

U.S. PATENT DOCUMENTS

| | | | |
|---|---|---|---|
| 4,088,955 | A | 5/1978 | Baghdady |
| 4,309,769 | A | 1/1982 | Taylor, Jr. |
| 4,359,738 | A | 11/1982 | Lewis |
| 4,601,046 | A | 7/1986 | Halpern |
| 4,665,401 | A | 5/1987 | Garrard et al. |
| 4,670,885 | A | 6/1987 | Parl et al. |
| 4,713,794 | A | 12/1987 | Byington et al. |
| 4,780,885 | A | 10/1988 | Paul et al. |
| 4,856,025 | A | 8/1989 | Takai |
| 4,893,316 | A | 1/1990 | Janc et al. |
| 4,922,506 | A | 5/1990 | McCallister et al. |
| 4,933,639 | A | 6/1990 | Barker |
| 4,965,732 | A | 10/1990 | Roy, III et al. |
| 5,017,929 | A | 5/1991 | Tsuda |
| 5,099,493 | A | 3/1992 | Zeger et al. |
| 5,105,435 | A | 4/1992 | Stilwell |
| 5,109,390 | A | 4/1992 | Gilhousen et al. |
| 5,119,401 | A | 6/1992 | Tsujimoto |
| 5,136,296 | A | 8/1992 | Roettger et al. |
| 5,151,919 | A | 9/1992 | Dent |
| 5,218,359 | A | 6/1993 | Minamisono |
| 5,218,619 | A | 6/1993 | Dent |
| 5,220,687 | A | 6/1993 | Ichikawa et al. |
| 5,224,122 | A | 6/1993 | Bruckert |
| 5,237,586 | A | 8/1993 | Bottomley |
| 5,263,191 | A | 11/1993 | Dickerson |
| 5,280,472 | A | 1/1994 | Gilhousen et al. |
| 5,305,349 | A | 4/1994 | Dent |
| 5,325,394 | A | 6/1994 | Bruckert |
| 5,343,493 | A | 8/1994 | Karimullah |
| 5,343,496 | A | 8/1994 | Honig et al. |
| 5,347,535 | A | 9/1994 | Karasawa et al. |
| 5,353,302 | A | 10/1994 | Bi |
| 5,377,183 | A | 12/1994 | Dent |
| 5,386,202 | A | 1/1995 | Cochran et al. |
| 5,390,207 | A | 2/1995 | Fenton et al. |
| 5,394,110 | A | 2/1995 | Mizoguchi |
| 5,396,256 | A | 3/1995 | Chiba et al. |
| 5,437,055 | A | 7/1995 | Wheatley, III |
| 5,440,265 | A | 8/1995 | Cochran et al. |
| 5,448,600 | A | 9/1995 | Lucas |
| 5,481,570 | A | 1/1996 | Winters |
| 5,506,865 | A | 4/1996 | Weaver, Jr. |
| 5,513,176 | A | 4/1996 | Dean et al. |
| 5,533,011 | A | 7/1996 | Dean et al. |
| 5,553,098 | A | 9/1996 | Cochran et al. |
| 5,602,833 | A | 2/1997 | Zehavi |
| 5,644,592 | A | 7/1997 | Divsalar |
| 5,646,964 | A * | 7/1997 | Ushirokawa et al. ........ 375/346 |
| 5,736,964 | A | 4/1998 | Ghosh et al. |
| 5,787,130 | A | 7/1998 | Kotzin et al. |
| 5,844,521 | A | 12/1998 | Stephens et al. |
| 5,859,613 | A | 1/1999 | Otto |
| 5,872,540 | A | 2/1999 | Casabona |
| 5,872,776 | A | 2/1999 | Yang |
| 5,894,500 | A | 4/1999 | Bruckert et al. |
| 5,926,761 | A | 7/1999 | Reed et al. |
| 5,930,229 | A | 7/1999 | Yoshida et al. |
| 5,953,369 | A | 9/1999 | Suzuki |
| 5,978,413 | A | 11/1999 | Bender |
| 5,995,499 | A | 11/1999 | Hottinen et al. |
| 6,002,727 | A | 12/1999 | Uesugi |
| 6,014,373 | A | 1/2000 | Schilling et al. |
| 6,018,317 | A | 1/2000 | Dogan et al. |
| 6,032,056 | A | 2/2000 | Reudink |
| 6,088,383 | A | 7/2000 | Suzuki et al. |
| 6,101,385 | A | 8/2000 | Monte et al. |
| 6,104,712 | A | 8/2000 | Robert et al. |
| 6,115,409 | A | 9/2000 | Upadhyay et al. |
| 6,127,973 | A | 10/2000 | Choi et al. |
| 6,131,013 | A | 10/2000 | Bergstrom et al. |
| 6,137,788 | A | 10/2000 | Sawahashi et al. |
| 6,141,332 | A | 10/2000 | Lavaen |
| 6,154,443 | A | 11/2000 | Huang et al. |
| 6,157,685 | A | 12/2000 | Tanaka et al. |
| 6,157,842 | A | 12/2000 | Kaisson et al. |
| 6,157,847 | A | 12/2000 | Buehrer et al. |
| 6,163,696 | A | 12/2000 | Bi et al. |
| 6,166,690 | A | 12/2000 | Lin et al. |
| 6,172,969 | B1 | 1/2001 | Kawakami et al. |
| 6,175,587 | B1 * | 1/2001 | Madhow et al. ............. 375/148 |
| 6,192,067 | B1 | 2/2001 | Toda et al. |
| 6,201,799 | B1 | 3/2001 | Huang et al. |
| 6,215,812 | B1 | 4/2001 | Young et al. |
| 6,219,376 | B1 | 4/2001 | Zhodzishsky et al. |
| 6,222,828 | B1 | 4/2001 | Ohlson et al. |
| 6,230,180 | B1 | 5/2001 | Mohamed |
| 6,233,229 | B1 | 5/2001 | Ranta et al. |
| 6,233,459 | B1 | 5/2001 | Sullivan et al. |
| 6,240,124 | B1 | 5/2001 | Wiedeman et al. |
| 6,252,535 | B1 | 6/2001 | Kober et al. |
| 6,256,336 | B1 | 7/2001 | Rademacher et al. |
| 6,259,688 | B1 | 7/2001 | Schilling et al. |
| 6,263,208 | B1 | 7/2001 | Chang et al. |
| 6,266,529 | B1 | 7/2001 | Chheda |
| 6,275,186 | B1 | 8/2001 | Kong |
| 6,278,726 | B1 | 8/2001 | Mesecher et al. |
| 6,282,231 | B1 | 8/2001 | Norman et al. |
| 6,282,233 | B1 | 8/2001 | Yoshida |
| 6,285,316 | B1 | 9/2001 | Nir et al. |
| 6,285,319 | B1 | 9/2001 | Rose |
| 6,285,861 | B1 | 9/2001 | Bonaccorso et al. |
| 6,301,289 | B1 | 10/2001 | Bejjani et al. |
| 6,304,618 | B1 | 10/2001 | Hafeez et al. |
| 6,308,072 | B1 | 10/2001 | Labedz et al. |
| 6,310,704 | B1 | 10/2001 | Dogan et al. |
| 6,317,453 | B1 | 11/2001 | Chang |
| 6,321,090 | B1 | 11/2001 | Soliman |
| 6,324,159 | B1 | 11/2001 | Mennekens et al. |
| 6,327,471 | B1 | 12/2001 | Song |
| 6,330,460 | B1 | 12/2001 | Wong et al. |
| 6,333,947 | B1 | 12/2001 | van Heeswyk et al. |
| 6,351,235 | B1 | 2/2002 | Stilp |
| 6,351,642 | B1 | 2/2002 | Corbett et al. |
| 6,359,874 | B1 | 3/2002 | Dent |
| 6,362,760 | B2 | 3/2002 | Kober et al. |
| 6,363,104 | B1 | 3/2002 | Bottomley |
| 6,377,636 | B1 | 4/2002 | Paulraj et al. |
| 6,380,879 | B2 | 4/2002 | Kober et al. |
| 6,385,264 | B1 | 5/2002 | Terasawa |
| 6,396,804 | B2 | 5/2002 | Odenwalder |
| 6,404,760 | B1 | 6/2002 | Holtzman et al. |
| 6,430,216 | B1 | 8/2002 | Kober et al. |
| 6,459,693 | B1 | 10/2002 | Park et al. |
| 6,501,788 | B1 | 12/2002 | Wang |
| 6,515,980 | B1 | 2/2003 | Bottomley |
| 6,570,909 | B1 | 5/2003 | Kansakoski |
| 6,574,270 | B1 | 6/2003 | Madkour |
| 6,580,771 | B2 | 6/2003 | Kenney |
| 6,584,115 | B1 | 6/2003 | Suzuki |
| 6,590,888 | B1 | 7/2003 | Ohshima |
| 6,680,727 | B2 | 1/2004 | Butler |
| 6,798,737 | B1 | 9/2004 | Dabak |
| 6,801,565 | B1 | 10/2004 | Bottomley |
| 2001/0003443 | A1 | 6/2001 | Velazquez et al. |
| 2001/0020912 | A1 | 9/2001 | Naruse et al. |
| 2001/0021646 | A1 | 9/2001 | Antonucci et al. |
| 2001/0046266 | A1 | 11/2001 | Rakib et al. |
| 2002/0001299 | A1 | 1/2002 | Petch et al. |
| 2002/0051433 | A1 * | 5/2002 | Affes et al. ................. 370/335 |
| 2002/0172173 | A1 | 11/2002 | Schilling et al. |
| 2002/0176488 | A1 | 11/2002 | Kober et al. |
| 2003/0053524 | A1 * | 3/2003 | Dent ......................... 375/148 |
| 2003/0053526 | A1 | 3/2003 | Reznik |

| | | | |
|---|---|---|---|
| 2003/0092456 A1* | 5/2003 | Dent | 455/503 |
| 2003/0231702 A1* | 12/2003 | Oates et al. | 375/148 |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 1/1993 |
| EP | 0610989 A2 | 1/1994 |
| GB | 2280575 A | 2/1995 |
| JP | 2000-13360 A | 1/2000 |
| WO | WO 93/12590 | 6/1993 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Tranactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximun Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversio n by Pulse-Count Modulation Methods, IEEE Transactions on Instrumentation and Measurement, Aug. 1996, vol. 45, No. 4.

Ortega et al., Analog to Digital and Digital to Analog Conversion Based on Stochastic Logic, IEEE 0-7803-3026-9/95,1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

* cited by examiner

INTERFERENCE MATRIX CONSTRUCTION

CROSS REFERENCE TO RELATED APPLICATIONS

This application is a continuation-in-part of commonly owned and U.S. patent application Ser. No. 10/773,777 (filed Feb. 6, 2004; now U.S. Pat. No. 7,394,879 the "'777 application"), Ser. No. 10/686,829 (filed Oct. 15, 2003; the "'829 application") and the commonly owned U.S. Patents; U.S. patent application Ser. No. 10/294,834 (filed Nov. 15, 2002; the "'834 application"), issued on Apr. 3, 2007 as U.S. Pat. No. 7,200,183; U.S. patent application Ser. No. 10/686,359 (filed Oct. 15, 2003; the "'359 application"), issued on Jun. 27, 2006 as U.S. Pat. No. 7,068,706; and Ser. No. 10/247,836 (filed Sep. 20, 2002; the "'836 application"), issued on Jan. 2, 2007 as U.S. Pat. No. 7,158,559, which are all hereby incorporated by reference.

BACKGROUND

1. Field of the Invention

The invention generally relates to the field of communications. More specifically the invention is related to interference suppression for use in coded signal communications, such as Code Division Multiple Access ("CDMA") communications, Wideband CDMA ("WCDMA") communications, Global Positioning System ("GPS") communications, Broadband CDMA communications, Universal Mobile Telephone Service ("UMTS") communications and combinations thereof.

2. Discussion of the Related Art

In CDMA telephony, coded signals are used to communicate between devices. Some typical CDMA telephony systems use combinations of "spreading codes" and "covering codes" to encode signals. These encoded digital signals are used to convey digital voice, data and/or other forms of digital communication. As used herein, spreading codes generally refer to "on-time" pseudorandom number, or pseudo-noise ("PN"), sequence codes. The particular timing alignment of a selected signal may be used in the extraction of the data from the assigned signal tracked within a receiver. Spreading codes and covering codes are known to those skilled in the art.

A spreading code encodes a data signal by applying the noise-like code sequence to the data at a rate faster than that of the data. For example, the spreading code is applied to the data such that there are multiple "chips" of the code for any given element of data. Such an application of the spreading code is commonly referred to as direct sequence spreading of the data. A short code is an example of a spreading code. Chips and their associated chip rates are known to those skilled in the art.

A covering code further encodes the signal to provide "channelization" of a signal. For example, each unique covering code as it is applied to a spread signal provides a unique communication channel for the spread signal. This channelization allows a signal to be divided into a number of individual communication channels that may be either shared or assigned to specific users. Covering codes typically include families of codes that are either orthogonal (e.g., Walsh codes) or substantially orthogonal (e.g., Quasi Orthogonal Function codes, or "QOF" codes). Such codes are known to those skilled in the art.

Interference may degrade signal detection, tracking and processing capabilities of a receiver by hindering the reception of a selected signal. In CDMA communications, for example, interference can be the result of receiving one or more unwanted signals simultaneously with a selected signal. These unwanted signals can be coded signals having properties that are similar to that of the selected signal. Because of the non-orthogonality of the codes and the corresponding energy of the signals, the coded signals often have a tendency to interfere with one another and disrupt reception of the selected signal. The lack of orthogonality in the codes used to encode the transmitted signals results in leakage between signals. Examples of such interference include "cross-channel" interference and "co-channel" interference.

Co-channel interference may include multipath interference from the same transmitter, wherein separate transmission paths follow unique routes that cause an interfering signal path and a selected signal path to differentially arrive at a receiver, thereby hindering reception of the selected path. Cross-channel interference may include interference caused by signal paths of other transmitters hindering the reception of the selected signal path. Such interference can interfere with data recovery as long as it is present in any substantial form. Interference is a continuing problem in communications, particularly in CDMA telephony.

SUMMARY

The present invention provides systems and methods for interference matrix construction. Such an interference matrix may be used to generate a cancellation operator that when applied to a signal may substantially cancel, or remove, certain interfering signals. In one embodiment of the invention, a system comprises an interference selector configured for selecting one or more interferers for interference cancellation. The system also comprises a matrix generator communicatively coupled to the interference selector and configured for receiving one or more interferers selected by the interference selector. The matrix generator is also configured for generating a matrix having one or more vectors. Each vector comprises elements of at least one of the selected interferers.

In one embodiment, the interference selector comprises a signal path selector and a channel selector. The channel selector may select certain channels from signal paths selected by the signal path selector for cancellation. For example, each signal path may have one or more associated channels. Further, each unique signal path may correspond to any of a unique base station or multipath. Once the interference selector provides a selected number of signal paths to the channel selector, the channel selector may select certain channels from the selected signal paths based on a predetermined criteria, such as thresholds and/or known processing requirements, as a matter of design choice (e.g., select for cancellation up to a predetermined number of channels that exceed a threshold). These selected channels may be used as inputs in the form of vectors in the construction of an interference matrix. Those skilled in the art should readily recognize that the process of selecting a signal path for cancellation and selecting a channel for cancellation may be done in any order.

For use in a typical CDMA telephony system, the interference matrix may be constructed from one or more vectors using 1) the covering code (e.g., a Walsh code or a QOF code) of a channel, 2) the on-time spreading code (e.g., the short code) corresponding to an associated signal path(s) as obtained or produced from processing fingers tracking those signal paths and 3) phase estimates also obtained or produced from the processing fingers tracking those signal paths. Once the interference matrix is constructed, the cancellation operator may be generated therefrom to subsequently cancel the selected interfering signals through the application of the cancellation operator to an input signal.

In constructing the vectors for the interference matrix, codes (i.e., short codes, Walsh codes and/or QOF covering codes) of a particular data symbol are typically used. For example, in a CDMA system using 128-chip Walsh codes, there may be 128 chips that are used to encode a single symbol of a channel. These code chips may be used in the construction of a vector in an interference matrix. The interference matrix can also be used to cancel these interfering channels as well as interferers employing shorter Walsh codes because, among other reasons, longer Walsh codes, such as the 128-chip Walsh codes, may be generated from a concatenation of so-called short Walsh codes (e.g., as can be seen from the generation of well known Hadamard matrices). These shorter Walsh codes are often referred to as supplemental channel codes and are used as higher rate data channels.

While interference vectors are described as being generated from the chips of one symbol, chips from multiple symbols or even sub symbols may be used. Accordingly, the invention is not intended to be limited to any particular number of chips or symbol lengths. A maximum length of a symbol in chips of one particular coding scheme (e.g. as specified by its Radio Configuration, or "RC" in cdma2000) is referred to as the nominal length. Thus, cancellation can be performed over the nominal length, some sub nominal length or a longer length. Additionally, these signals may be oversampled and the vectors, therefore, may comprise samples. Choice of oversampling rates may be a design choice associated with the requirements of the code tracking.

Optional features of the vector construction include the use of sign information and/or amplitude information of the transmitted symbols. The sign information as used herein is the estimated sign value of a symbol. The amplitude information as used herein is the estimated amplitude value of a channel selected for cancellation. This estimated amplitude may be an amplitude estimate relative to amplitudes of other channels selected for cancellation (e.g. the estimated amplitudes of the channels need only be substantially proportional to the received amplitudes). Alternatively, the estimated amplitude may be an absolute received amplitude. The amplitude estimates include estimated sign information. The code elements in the interference vector (i.e., the vector elements) may be multiplied with this optional information to impose the information upon the vector for improved cancellation.

With the options of sign information and amplitude information, interference matrix construction can be implemented in a variety of manners. For example, any given interference matrix may include one or more interference vectors constructed from code elements and phase estimates alone and/or interference vectors constructed from code elements, phase estimates with sign information and/or amplitude information.

Another feature allows for the generation of a "composite" interference vector ("CIV"). The CIV is a combination of a plurality of interference vectors employing the relative or absolute amplitude information of the vectors. For example, when constructing a matrix comprising a plurality of vectors as described above (i.e., one vector per channel), amplitude information of the symbols for any given channel may be imposed on the code elements of the vector. The elements of these amplitude imposed vectors may be summed using standard vector addition techniques to form a single CIV; although, alternative methods, such as those described in the '829 application, may be used. Effectively, the CIV is a linear combination of a plurality of interference vectors in which the weighting of the vectors is specified by amplitude estimates that include estimated sign. Such composition of interference vectors can improve performance by decreasing the number of computations in the generation of the cancellation operator. The number of vectors in a matrix can be reduced (e.g., a matrix can be reduced to a single CIV comprising information from multiple interfering channels and/or signal paths), thereby decreasing the rank of the matrix.

The matrix constructions shown and described herein are not intended to be limited to any particular embodiment. Matrices may be formed from various combinations of the vectors described to include even multiple CIVs. The projection operators generated from these matrices can be used to cancel selected interference component(s) from a digital signal conveying at least one selected interference component and a desired channel (such as a received signal y or a previously interference cancelled signal y'). The projection operators can also be generated from these matrices to cancel a selected interference component(s) from a reference signal (such as a reference code x or even a previously interference cancelled reference code x'). Moreover, the embodiments described herein can be implemented with either of a parallel signal cancellation embodiment (e.g., the '777 application) or a serial signal cancellation embodiment (e.g., the '836 application).

In one embodiment of the invention, a system comprises: an interference selector configured for selecting one or more interferers for interference cancellation; and a matrix generator communicatively coupled to the interference selector and configured for receiving selected said one or more interferers from the interference selector and for generating a matrix having one or more vectors, wherein each vector comprises elements of at least one of the selected said one or more interferers.

In another embodiment of the invention, the system further comprises a processor communicatively coupled to the matrix generator and configured for using the matrix to generate a cancellation operator.

In another embodiment of the invention, the cancellation operator substantially comprises the following form:

$$P_s^\perp = I - S(S^T S)^{-1} S^T,$$

where $P_s^\perp$ is the cancellation operator, I is an identity matrix, S is the matrix and $S^T$ is a transpose of the matrix.

In another embodiment of the invention, the system further comprises an applicator configured for applying the cancellation operator to an input signal to substantially cancel the selected said one or more interferers from the input signal and to generate a substantially interference cancelled signal.

In another embodiment of the invention, the input signal is one of a received digital signal or a reference code.

In another embodiment of the invention, the system is configurable with a receiver to provide a substantially interference cancelled received signal to a processing finger of the receiver.

In another embodiment of the invention, the receiver is configurable with a base station or a handset.

In another embodiment of the invention, the system further comprises a phase estimator configured for estimating phase information of the one or more interferers for application to the elements of the one or more vectors, wherein each vector has a phase estimate imposed thereon.

In another embodiment of the invention, the system further comprises a sign detector configured for detecting sign information of the one or more interferers for application to the elements of the one or more vectors.

In another embodiment of the invention, the system further comprises an amplitude estimator configured for estimating amplitude information of the one or more interferers for application to the elements of the one or more vectors.

In another embodiment of the invention, the estimated amplitude information is estimated relative amplitude information.

In another embodiment of the invention, the estimated amplitude information is estimated absolute amplitude information.

In another embodiment of the invention, the interference selector is further configured for selecting the one or more interferers based upon a threshold.

In another embodiment of the invention, the interference selector is further configured for selecting the one or more interferers based upon a predetermined number.

In another embodiment of the invention, at least one of the vectors comprises a nominal length number of elements.

In another embodiment of the invention, the elements comprise covering code elements and spreading code elements.

In another embodiment of the invention, the elements further comprise estimated phase elements.

In another embodiment of the invention, the matrix generator is further configured for combining at least two of the one or more vectors to generate a composite vector.

In another embodiment of the invention, the interference selector comprises a signal path selector configured for selecting one or more signal paths, wherein said one or more interferers comprise the one or more signal paths.

In another embodiment of the invention, the interference selector further comprises a channel selector communicatively coupled to the signal path selector and configured for selecting one or more channels for channel cancellation from the one or more signal paths.

In another embodiment of the invention, at least one of the vectors comprises elements from a sub-symbol, a single symbol or multiple symbols.

In another embodiment of the invention, the system is configurable as an Application Specific Integrated Circuit, a Digital Signal Processor, a Field Programmable Gate Array or an Advanced RISC Machine.

In another embodiment of the invention, the system is configurable with a handset and/or a base station.

In one embodiment of the invention, a system comprises: a channel selector configured for selecting two or more channels for channel cancellation; and a matrix generator communicatively coupled to the channel selector and configured for receiving selected said two or more channels from the channel selector and for generating a matrix having a vector comprising elements from at least two of the selected said two or more channels.

In one embodiment of the invention, an interference matrix comprises: a vector of elements, wherein each element is a composite of elements from selected interfering channels and wherein the interference matrix is used to substantially remove the selected interfering channels from a received signal or a reference signal.

In another embodiment of the invention, the vector is a composite vector and wherein the elements from the selected interfering channels are summed elements of two or more interfering channels.

In one embodiment of the invention, a receiver comprises: circuitry, comprising an analog to digital converter configured for converting a received analog signal into a digital signal; and a processing engine communicatively coupled to the circuitry and comprising an interference selector configured for selecting one or more interfering signals for cancellation, and a matrix generator communicatively coupled to the interference selector and configured for receiving selected said one or more interfering signals from the interference selector and for generating a matrix having a vector comprising elements from at least two of the selected said one or more interfering signals, wherein the matrix is used to generate a cancellation operator that substantially cancels said at least two of the selected said one or more interfering signals from the digital signal.

In another embodiment of the invention, the selected said one or more interfering signals comprise a Code Division Multiple Access signal, a Wideband Code Division Multiple Access signal, a Global Positioning System signal and/or a Universal Mobile Telephone Service signal.

In one embodiment of the invention, a method comprises: selecting one or more channels for cancellation from a first signal path; generating at least one vector comprising elements from at least one selected said one or more channels; and generating a matrix from said at least one vector, wherein the matrix is used for generating a cancellation operator.

In one embodiment of the invention, the method further comprises generating a cancellation operator from the matrix, wherein the cancellation operator is used to substantially cancel the selected said one or more channels from an input signal.

In one embodiment of the invention, the method further comprises generating a composite interference vector.

In one embodiment of the invention, the method further comprises estimating phase of the first signal path in response to selecting the one or more channels, wherein the one or more channels are associated with the first signal path via an on-time PN code.

In one embodiment of the invention, the method further comprises estimating a relative amplitude or an absolute amplitude of said at least one or more channels in response to selecting the one or more channels.

In one embodiment of the invention, the method further comprises estimating a sign of said at least one selected said one or more channels in response to selecting the one or more channels. The sign of said at least one selected said one or more channels is the sign of a symbol.

In one embodiment of the invention, the method further comprises selecting one or more channels for cancellation from a second signal path in response to selecting the one or more channels for cancellation from the first signal path.

In one embodiment of the invention, the method further comprises estimating phase of second signal path.

In one embodiment of the invention, the method further comprises imposing the estimated phase on vector elements associated with the second signal path.

In one embodiment of the invention, the method further comprises estimating a relative amplitude or an absolute amplitude of selected said one or more channels from the second signal path in response to selecting the one or more channels for cancellation.

In one embodiment of the invention, the method further comprises imposing the relative amplitude or the absolute amplitude on the vector elements of said at least one vector.

DETAILED DESCRIPTION OF THE DRAWINGS

Figure 1:
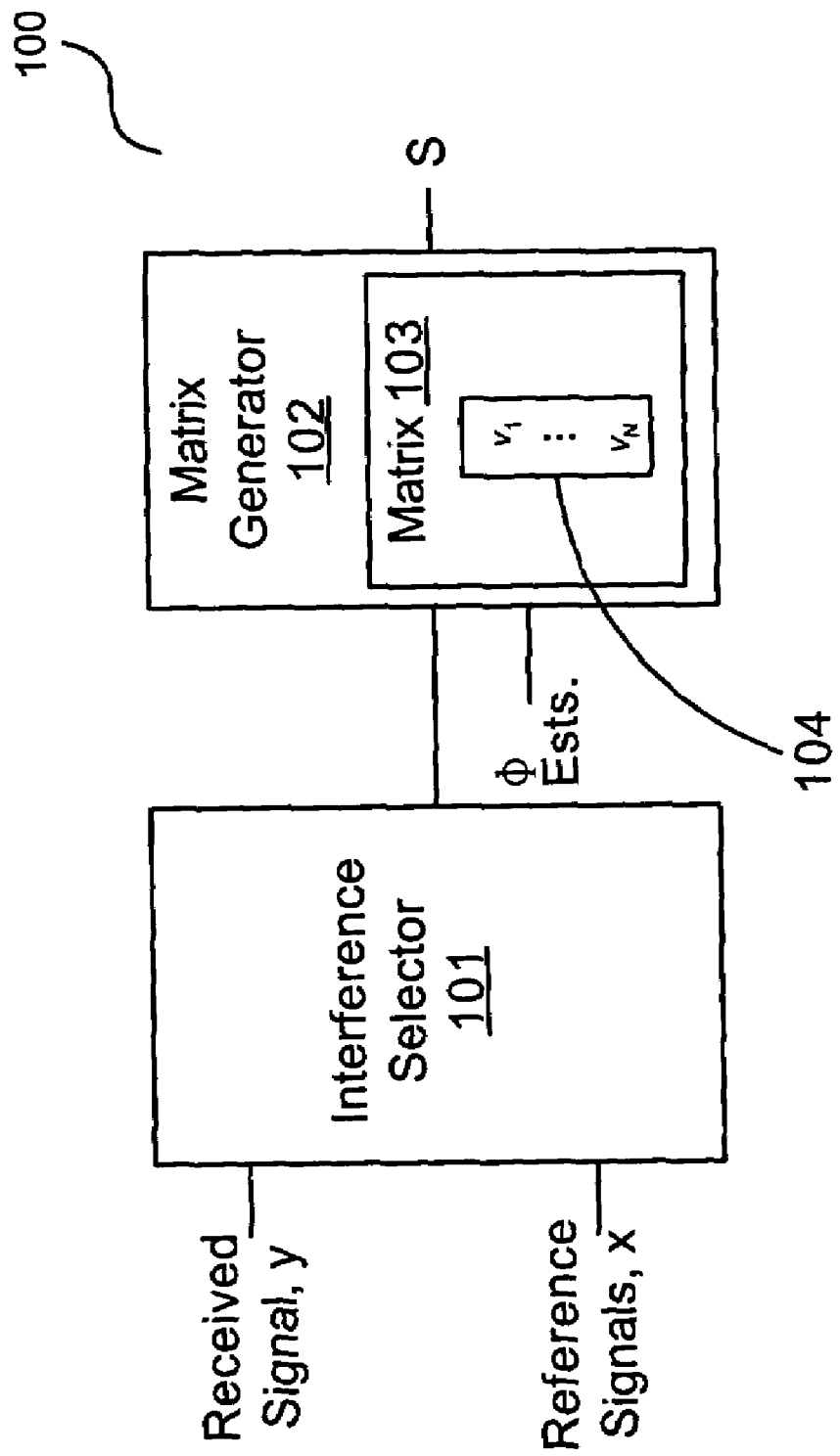
FIG. 1 is a block diagram of an exemplary matrix generation system in one embodiment of the invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

With reference to FIG. 1, FIG. 1 is a block diagram of an exemplary matrix generation system 100 in one embodiment of the invention. In this embodiment, the matrix generation system 100 comprises an interference selector 101 and a matrix generator 102. Interference selector 101 is configured for receiving a received signal y and selecting interferers as inputs to matrix 103 for cancellation. For example, the received signal y may comprise a signal selected for processing as well as a plurality of interfering signals and noise. Interference selector 101 may select certain interfering signals from the received signal y and transfer information about those interfering signals to the matrix generator 102.

Additionally, interference selector 101 receives reference signals x, which comprise other information, such as on-time spreading codes, of the interfering signals. This information can either be used by matrix generator 102 to generate matrix 103 and/or it can be used to assist in the selection of the interfering signals by identifying certain features (e.g., amplitude) of the interfering signals. For example, matrix generator 102 may construct one or more vectors 104, wherein each vector comprises code elements of a selected interfering signal. These vectors can be constructed directly from the reference signals x (i.e., wherein x represents code elements from stored or generated codes) as selected by the interference selector 101 being assisted by the reference signals x. Examples of codes that are representative of the reference signals x include spreading codes (e.g., short codes) and/or covering codes (e.g., Walsh codes and/or QOF codes).

Matrix generator 102 can impart other information from these interfering signals onto the elements of the vectors 104. For example, each of these interfering signals comprises amplitude information, sign information and/or phase information. Matrix generator 102 therefore may impart one or more of these types of information onto the vector elements (labeled $v_1 \ldots v_N$) themselves. For example, each vector element may have one or more of these types of information imparted on it over each symbol, multiple symbols or over one sub symbol. If the vector elements comprise more than one symbol, each symbol or sub symbol of vector elements may have a different value imparted on it. The matrix 103 resulting from this construction can be used to generate a cancellation operator, which substantially cancels, or removes, these interfering signals from the received signal y.

In one embodiment of the invention, matrix 103 is used to generate a projection operator which projects a signal onto a subspace that is substantially orthogonal to a subspace of the interfering signals. In such an embodiment, the projection operator is generated according to the following form:

$$P_s^\perp = I - S(S^T S)^{-1} S^T, \tag{Eq. 1}$$

wherein $P_s^\perp$ is the projection operator, I is an identity matrix, S is the interference matrix 103 and S is a transpose of the interference matrix.

Figure 2:
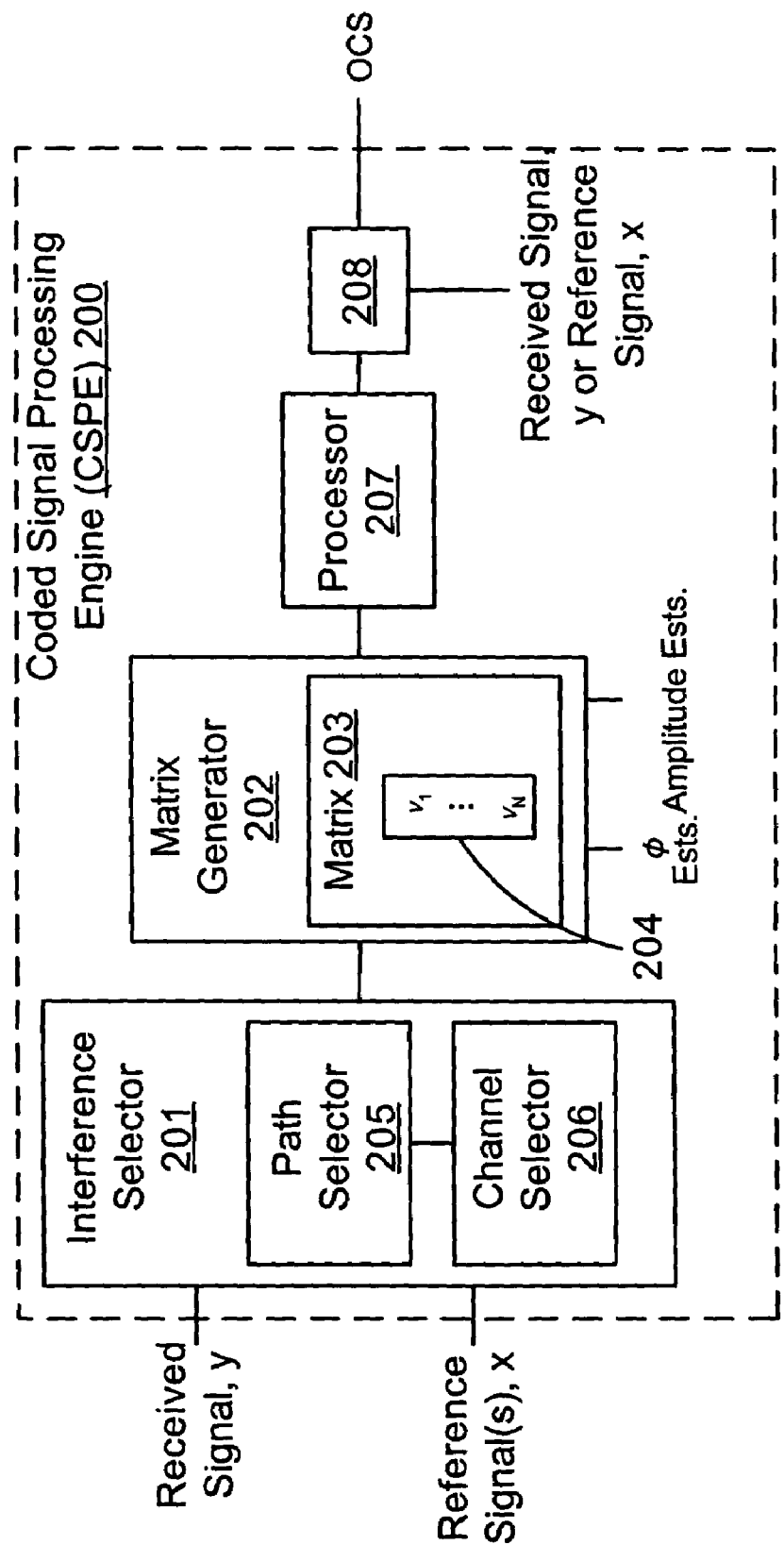
FIG. 2 is a block diagram of an exemplary Coded Signal Processing Engine in one embodiment of the invention.

FIG. 2 is a block diagram of exemplary Coded Signal Processing Engine ("CSPE") 200 in one embodiment of the invention. CSPE 200 is configured for substantially canceling selected interfering signals. More specifically, CSPE 200 can substantially cancel interference such as co-channel interference and cross-channel interference typical of CDMA communication systems. CSPE 200 may substantially cancel these interfering signals from a received signal y by either applying a cancellation operator directly to the received signal y, a reference code x and/or an output cancelled signal. This substantial cancellation can result in an improved Signal to Noise Ratio ("SNR") of a selected, or desired, signal.

In this embodiment, CSPE 200 comprises interference selector 201 and matrix generator 202 configured in an arrangement similar to that of the matrix generation system 100 of FIG. 1. Interference selector 201 comprises path selector 205 configured for selecting one or more signal paths for cancellation. Interference selector 201 also comprises channel selector 206 configured for selecting certain channels from the signal paths that are selected for cancellation.

A signal path in CDMA telephony is typically a set of signals encoded with a certain PN code sequence that corresponds to a single ray emanating from a transmitter. The PN code sequence has a particular timing alignment with respect to other signal paths. For example, in co-channel interference, a signal path of an interfering signal may be differentially aligned in time (i.e., having a different location in the PN code sequence) and/or varied in phase with respect to a selected signal because the interfering signal is a multipath signal corresponding to the same transmitter as the selected signal. In cross-channel interference, a signal path of an interfering signal may be differentially aligned in time and/or varied in phase with respect to the signal path of a selected signal because, among other reasons, the interfering signal and the selected signal emanate from unique base stations, each having a designated PN code timing offset.

The set of signals corresponding to a signal path (i.e., those associated with a certain PN code sequence or offset) are typically referred to as channels. Signals are often further encoded with a covering code to provide individual channels for a given PN code sequence. For example, in CDMA communication systems, each transmitted signal is typically encoded with either a unique covering code (e.g., Walsh code or QOF code) in addition to the PN code shared by each channel of a signal path in order to differentiate between different logical channels. Accordingly, the use of a unique covering code makes the channels among the same signal path distinct and allows recovery of each channel's transmitted data.

Path selector 205 selects an interfering signal path for matrix 203 construction based on the PN code of the signal path. Path selector 205 may select one or more of the signal paths based on a control determination by CSPE 200 or some other control functionality external to CSPE 200. Preferably, once the signal paths are selected, the channel selector 206, communicatively coupled to path selector 205, selects one or more interfering channels for cancellation from selected signal paths. Channel selector 206 may select one or more of these interfering channels for matrix 203 construction based on the covering codes of those channels and/or according to some predetermined criteria, such as amplitude of each channel. A channel selected for processing may experience interference from other channels within the same signal path if the covering codes are not completely orthogonal. This may occur when a transmitter employs different families of QOFs or combinations of Walsh codes and QOFs. As such, these interfering channels may be selected for matrix 203 construction and, thus, for cancellation. Those skilled in the art should readily recognize that selection order of channels or signal paths is not an essential feature of the invention.

To substantially cancel the interfering signals, CSPE 200 generates a cancellation operator from selected interfering signals (e.g., signal paths and/or channels) and applies the cancellation operator to either a received signal y or a selected reference signal x. This application of a cancellation operator generates an output cancelled signal (i.e., labeled OCS) wherein the selected interfering signal paths are substantially cancelled from the received signal y and/or reference signals x. In one embodiment of the invention, the cancellation operator is a projection operator that projects the received signal y or a selected reference signal x onto a subspace substantially orthogonal to the interfering signals, as described in Eq. 1. For example, the application of a cancellation operator to a received signal may be performed as follows:

$$y_{A} = P_{sA}^{\perp} y, \qquad (Eq. 2)$$

where $y_A$ is the output cancelled signal with the signal path A substantially canceled from the received signal and where $P_{sA}^{\perp}$ is the projection operator generated from a matrix comprising information such as code elements from signal path A.

To generate the cancellation operator, matrix generator 202 generates an interference matrix 203 based on selected signal paths and channels. For example, to cancel certain channels within a selected signal path, covering code elements of the channels and their associated short code elements may be used in the construction of vectors 204 in the interference matrix 203. Although, those skilled in the art should readily recognize that other signal paths, channels or combinations thereof could be used as vectors 204 to the interference matrix 203. As matrix generator 202 constructs interference matrix 203, matrix generator 202 may also provide other information for the construction of the vectors 204, such as sign estimates, amplitude estimates (e.g., relative and/or absolute amplitude estimates) and/or phase estimates.

Matrix generator 202 may generate one or more vectors 204 for matrix 203, wherein each vector comprises elements that represent components of the interfering codes (e.g., short codes and covering codes). As one example, vector 204 may include elements representing a unique code of an interfering signal path as well as a unique code of a single interfering channel. In one embodiment, the vector 204 could comprise a composite interference vector of two or more vectors with each of the composite vectors representing an interfering signal path and channel combination with imparted amplitude information. Further, the vector 204 can be multiplied by a phase estimate of a corresponding selected interfering signal path and may even have additional information, such as the previously mentioned sign estimates, imparted on the vector as well exemplary phase estimation, amplitude estimation and sign estimation are described below in FIGS. 4, 5 and 6, respectively.

Since multiple vectors 204 may each be used to represent multiple interfering signals, ach matrix 203 may be generated to cancel a plurality of interfering signal path and channel combinations. For example, matrix 203 may include a vector representing a channel of one interfering signal path $A_1$ and another vector representing a channel of another interfering signal path $A_2$. Accordingly, matrix 203 may be constructed to generate a cancellation operator that substantially cancels a plurality of channels associated with signal path $A_1$ as well as a plurality of channels associated with signal path $A_2$. The channels included in the generation of the cancellation operator may be channels that meet a predetermined criterion. Moreover, at least one vector of matrix 203 may represent one or more channels of a single signal path A.

As an alternative example, matrix 203 may comprise one or more vectors wherein each vector comprises composite elements of a selected signal path and selected interfering channels of that path. In such an example, elements representing a plurality of channels from signal path $A_1$ may be combined to form a composite interference vector 204 of the selected interfering channels of signal path $A_1$. Similarly, a plurality of channels from the signal path $A_2$ may be combined to form a composite interference vector 204 of the selected interfering channels of signal path $A_2$. Each composite interference vector 204 may therefore allow for the cancellation of channels corresponding to an interfering signal path with a single vector. Although described through examples, the invention is not intended to be limited to these examples; rather the invention is only intended to be limited by the claims and their equivalents.

Once matrix 203 is constructed, processor 207 processes the matrix to generate a cancellation operator as described above in Eq. 1. Processor 207 then transfers the cancellation operator to applicator 208 for application to an input signal (e.g., a received signal y or a reference signal x). Applicator 208 applies the cancellation operator to the input signal to substantially cancel the interfering signals and generate the output canceled signal OCS (e.g., according to Eq. 2).

Although described in great detail with respect to a particular embodiment, the invention is not intended to be limited to the embodiment shown and described herein. For example, CSPE 200 may include a plurality of matrix generators 202, processors 207 and/or applicators 208. A processor may be, although not limited to, a general purpose processor, an Application Specific Integrated Circuit ("ASIC"), a Digital Signal Processor ("DSP"), a Field Programmable Gate Array ("FPGA"), hardware, software, firmware and/or combinations thereof. The processor may be operably controlled via hardware, software and/or firmware instructions to generate the cancellation operator. Those skilled in the art are familiar with processors, ASICs, DSPs, FPGAs, software, firmware and their various combinations, which may be used to implement the embodiments described and shown herein. Moreover, those skilled in the art should readily recognize that the described CSPE 200 may, in general, be implemented through software, firmware, hardware and/or various combinations thereof. Accordingly, the invention is only intended to be limited to the claims below and their equivalents.

Figure 3:
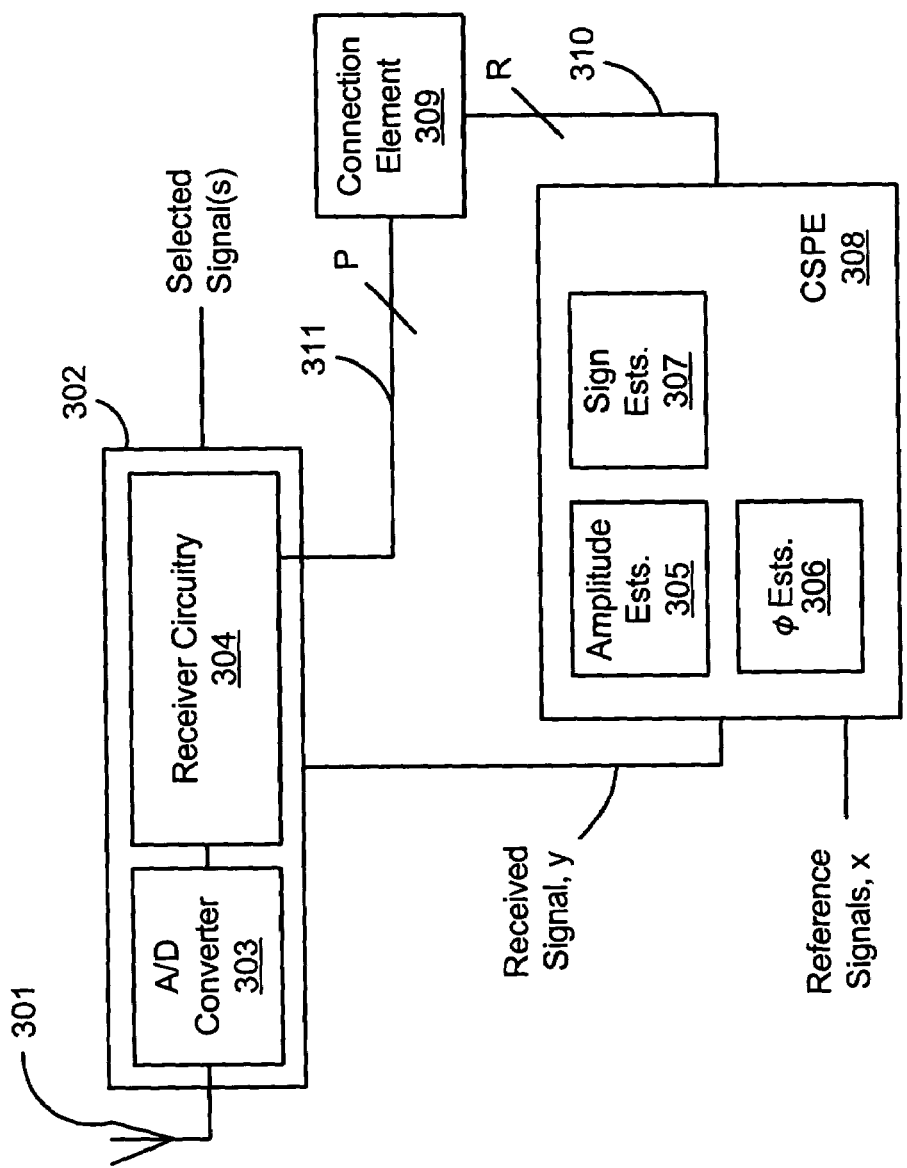
FIG. 3 is a block diagram of an exemplary Coded Signal Processing Engine configurable with a receiver in one embodiment of the invention.

FIG. 3 is a block diagram of exemplary CSPE 308 configurable with a receiver in one embodiment of the invention. In this embodiment, receiver circuitry 304 is configured with CSPE 308 via connection element 309 for selectively tracking signals through a plurality of receiver fingers (not shown; exemplarily described in the '777 patent application). For example, connection element 309 may allow the receiver circuitry 304 to track and subsequently demodulate a selected signal using a selected combination of output cancelled signals as well as the received signal y in the receiver fingers.

In this embodiment, receiver 302 receives a radio frequency ("RF") signal through antenna 301 and subsequently converts that signal to a digital received signal y using Analog-to-Digital ("A/D") converter 303. A/D converter 303 transfers the digital signal to receiver circuitry 304 for signal processing. Those skilled in the art should readily recognize that the received signal may include both In-phase ("I") and Quadrature ("Q") components.

Receiver circuitry 304 is configured for transferring the digitized received signal y and signal path tracking information to CSPE 308 for cancellation of selected interfering signals. CSPE 308 receives the signal y, as well as reference signals x (e.g., known codes from the interfering signal paths), and generates a cancellation operator that substantially cancels the selected interfering signals. For example, the interfering signals may be cross channel and/or co-channel interferers comprising known codes of a CDMA communication system. Such codes may be input to CSPE 308 on an as needed basis, stored within memory (not shown) local to CSPE 308 or generated by CSPE 308. Alternatively, the codes may be generated by a processor, such as processor 207 of FIG. 2, on an as needed basis.

In this embodiment, CSPE 308 generates one or more cancellation operators based on the information of the selected interfering signal path(s) and the selected, associated channel(s) according to the principles shown and described hereinabove. In generating the cancellation operators, CSPE 308 may use amplitude estimates 305, phase estimates 306 and/or sign estimates 307 of the interfering signal(s) to be cancelled. Once the CSPE 308 applies the cancellation operators to input signals and generates output cancelled signals, the output cancelled signals are transferred to connection element 309 via R-channel connection 310. R-channel connection 310 may be a communicative connection such as a data bus that allows for the transfer of R number of channels to connection element 309, wherein the number of channels R may be greater than the number of output cancelled signals generated. For example, R-channel connection 310 may be able to transfer all of the output cancelled signals generated by CSPE 308 as well as other signals such as the received signal y and/or reference signals x. Accordingly, connection element 309 is configurable to receive such a R channel inputs.

Connection element 309 is also configured for selectively transferring signals (e.g., the output cancelled signals and/or other uncancelled signals) to receiver circuitry 304 of receiver 302 via "P" channel connection 311. For example, connection element 309 may be a switching device, multiplexer, a plurality of multiplexers or another similar communication device that selectively transfers R number of signals to P number of channels, where P is an integer greater than one. Similar to R, P-channel connection 311 may be a communicative connection such as a data bus that allows for the transfer of P number of channels from connection element 309. In one embodiment the P channels correspond to P processing fingers in the receiver circuitry 304.

The control for connection element 309 may be applied independently of cancellation processing. Consequently, connection element 309 may or may not be configured within CSPE 308. For example, should selected reception of the output cancelled signals be decided by receiver 302, then connection element 309 may reside outside of the embodied CSPE 308. In a preferred embodiment, CSPE 308 includes the control functionality for connection element 309 that determines which of the output cancelled signals are transferred to receiver circuitry 304. For example, control functionality for connection element 309 may be associated with the P signals that provide the largest SNR gains for each particular finger. The invention, however, should not be limited to the preferred embodiment described and shown herein.

Figure 4:
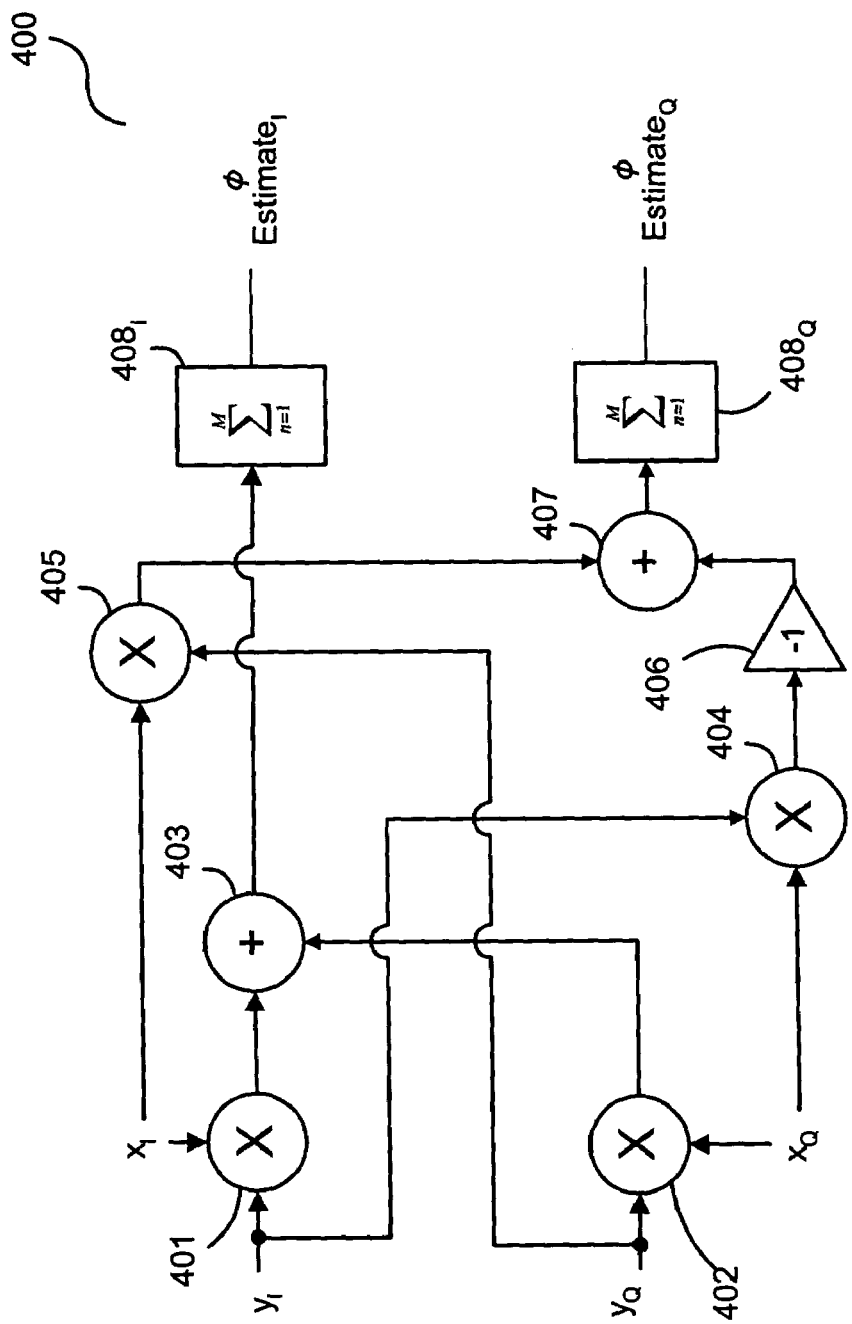
FIG. 4 is a block diagram of an exemplary phase estimator in one embodiment of the invention.

FIG. 4 is a block diagram of exemplary phase estimator 400 in one embodiment of the invention. Phase estimator 400 is configured for receiving a digital received signal y. In this embodiment, the received signal y comprises I and Q (i.e., $y_I$ and $y_Q$) components. Phase estimator 400 is also configured for receiving on-time PN code x also having I and Q (i.e., $x_I$ and $x_Q$) components. Typically, the pilot channel is used for phase estimation since its covering code is Walsh zero and it not an information bearing channel. From the received signal y and the reference codes x, phase estimator 400 generates a phase estimate of the selected signal path comprised of I and Q components (i.e., $\phi Estimate_I$ and $\phi Estimate_Q$) that can be used to specify an angle of a vector.

The $y_I$ and $x_I$ components are multiplied element-wise in element 401. This product is summed with the element-wise product of $y_Q$ and $x_Q$ as multiplied by element 402. The sum of these products is then summed (e.g., averaged) via element $408_I$ over an "M" length window to generate an I phase estimate component (i.e., $\phi Estimate_I$), wherein M is the number of chips or samples. For example, if the number of samples per symbol is 512 and the given correlation period is two symbols, M is equal to 1024. Those skilled in the art should readily recognize that the correlation period may be selected as a matter of design choice. In an exemplary embodiment M is equal to an integer multiple of symbols.

Similarly, the $y_I$ component is element-wise multiplied by the $x_Q$ component in element 404. The product of element 404 is subtracted (elements 406 and 407) from the element-wise product of the $y_Q$ and $x_I$ components provided in element 405. This sum is then summed (e.g., averaged) via element $408_Q$ over an M length window to generate a Q phase estimate component (i.e., $\phi Estimate_Q$), wherein M is again the number of number of chips or samples. The I and Q phase estimate components can be used to estimate the angle, as specified by the components of the phase estimate components, of the selected signal path.

Once phase estimates are generated, the components may be multiplied with the interference vectors corresponding to that signal path. For example, a phase estimate may be generated such that a vector comprising 64 code element chips, or an integer multiple of samples in the case of oversampling, for that one symbol can be multiplied by the phase estimate to impose phase information (i.e., phase information of the signal path) on the vector. Such an imposition of phase may lead to improved signal cancellation of the interfering signal.

The embodiment shown herein is one example of how phase estimates may be generated. Phase estimator 400 may be incorporated into either a receiver, such as receiver 302 of FIG. 3, or into a coded signal processing engine, such as CSPE 308 of FIG. 3. Those skilled in the art should readily recognize that the invention is not intended to be limited to the embodiment described and shown herein. Rather, other configurations may provide similar phase estimates that fall within the scope and spirit of the invention.

Figure 5:
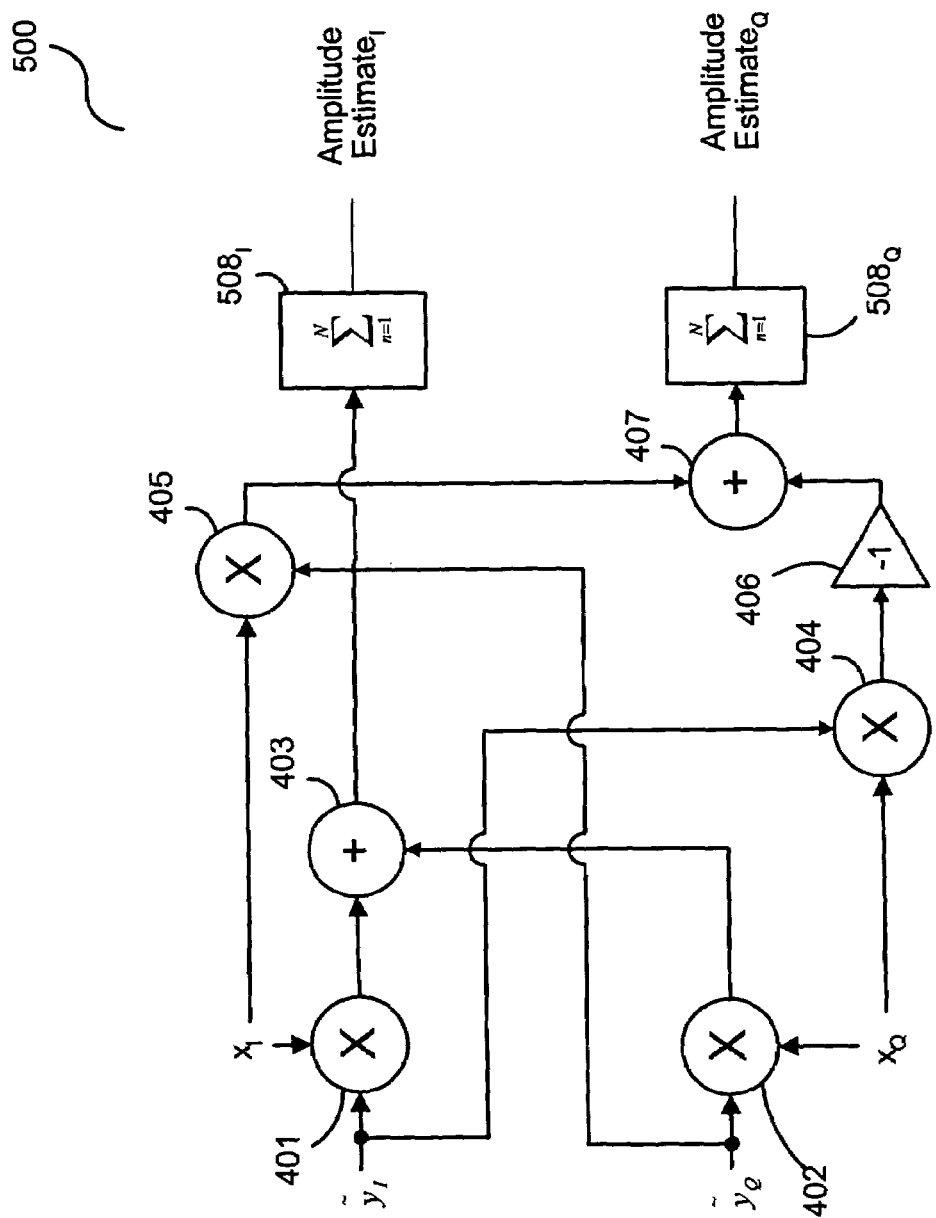
FIG. 5 is a block diagram of an exemplary amplitude estimator in one embodiment of the invention.

FIG. 5 is a block diagram of exemplary amplitude estimator 500 in one embodiment of the invention. Structurally, amplitude estimator 500 is the same as phase estimator 400 in FIG. 4. In this embodiment, however, amplitude estimator 500 is configured for receiving a phase adjusted (i.e., rotated) received signal ÿ comprising I and Q components (i.e., $ÿ_I$ and $ÿ_Q$). Amplitude estimator 500 is also configured for receiving reference codes x also having I and Q (i.e., $x_I$ and $x_Q$) components where the reference codes comprise a covering code and a spreading code. From the received signal ÿ and the reference codes x, amplitude estimator 500 generates amplitude estimates for the I and Q components (i.e., Amplitude Estimate$_I$ and Amplitude Estimate$_Q$). Once these amplitude estimates are generated, they may multiplied with the interference vectors in a manner similarly described in FIG. 4. In the preferred embodiment, amplitude estimates for the I and Q components are calculated over one symbol (N samples or chips) via elements 508 (correspondingly labeled 508$_I$ and 508$_Q$). The phase rotation of signals is described in the '359 patent application.

The embodiment shown herein is one example of how amplitude estimates are generated. Amplitude estimator 500 may be incorporated into either a receiver, such as receiver 302 of FIG. 3, or in a coded signal processing engine, such as CSPE 308 of FIG. 3. Those skilled in the art should readily recognize that the invention is not intended to be limited to the embodiment described and shown herein. Rather, other configurations may provide similar amplitude estimates that fall within the scope and spirit of the invention.

Figure 6:
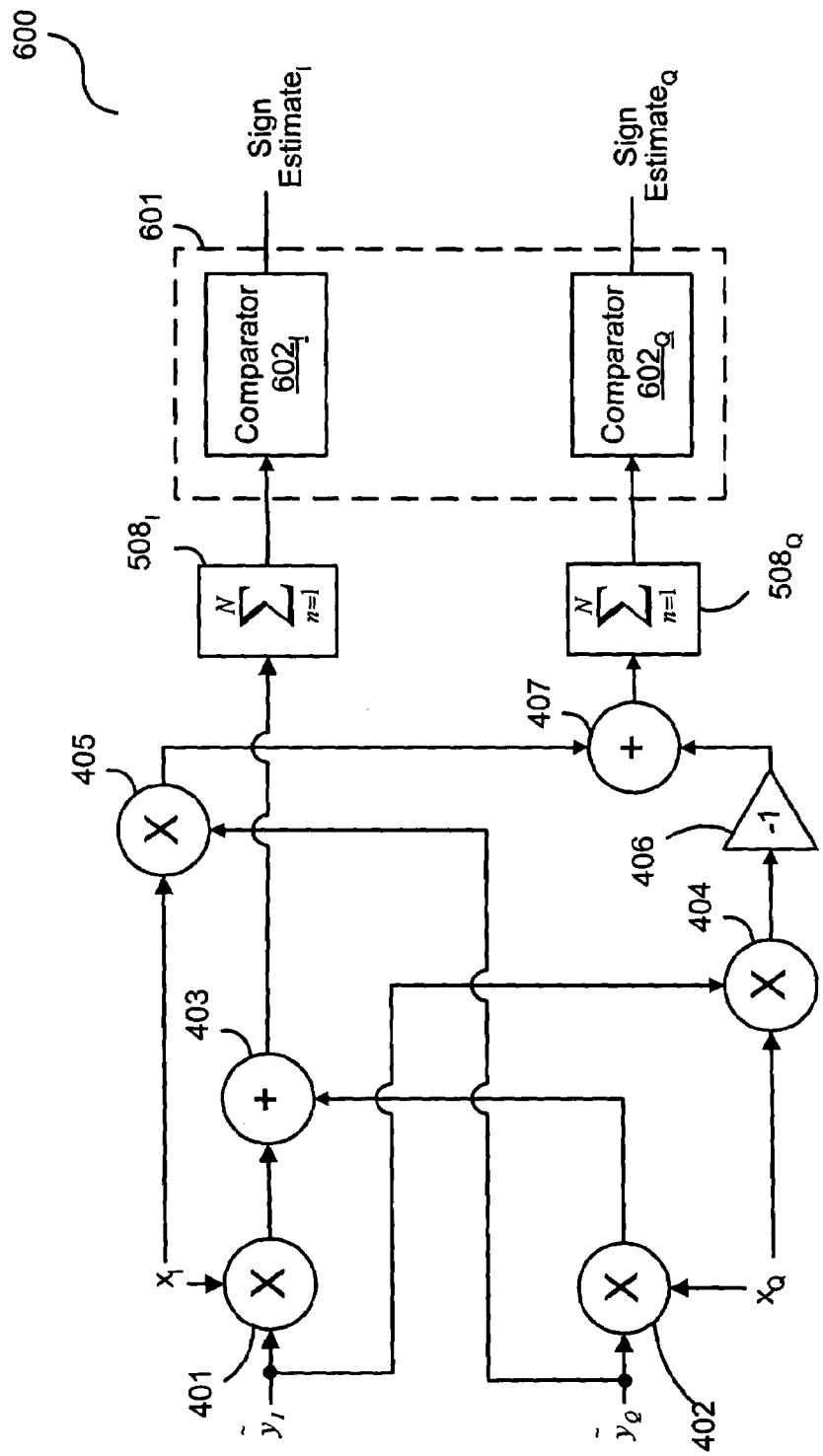
FIG. 6 is a block diagram of an exemplary sign estimator in one embodiment of the invention.

FIG. 6 is a block diagram of exemplary sign estimator 600 in one embodiment of the invention. In this embodiment, amplitude estimator 500 of FIG. 5 is configured with a comparator block 601. Comparator block 601 comprises an I component comparator 602 configured for receiving Amplitude Estimate$_I$ and detecting a sign value of Amplitude Estimate$_I$. For example, comparator 602, may compare the Amplitude Estimate$_I$ to zero, thereby determining whether Amplitude Estimate$_I$ is either positive or negative. Similarly, comparator 602$_Q$ is configured for receiving and detecting Amplitude Estimate$_Q$ to determine a sign value of Amplitude Estimate$_Q$. Once these sign estimates are generated, they may also be multiplied with symbols of the interference vectors in a manner similarly described in FIG. 4.

Those skilled in the art should readily recognize that sign estimator 600 is not intended to be limited to the embodiment described and shown herein. Rather, other configurations may provide similar sign estimates that fall within the scope and spirit of the invention.

Figure 7:
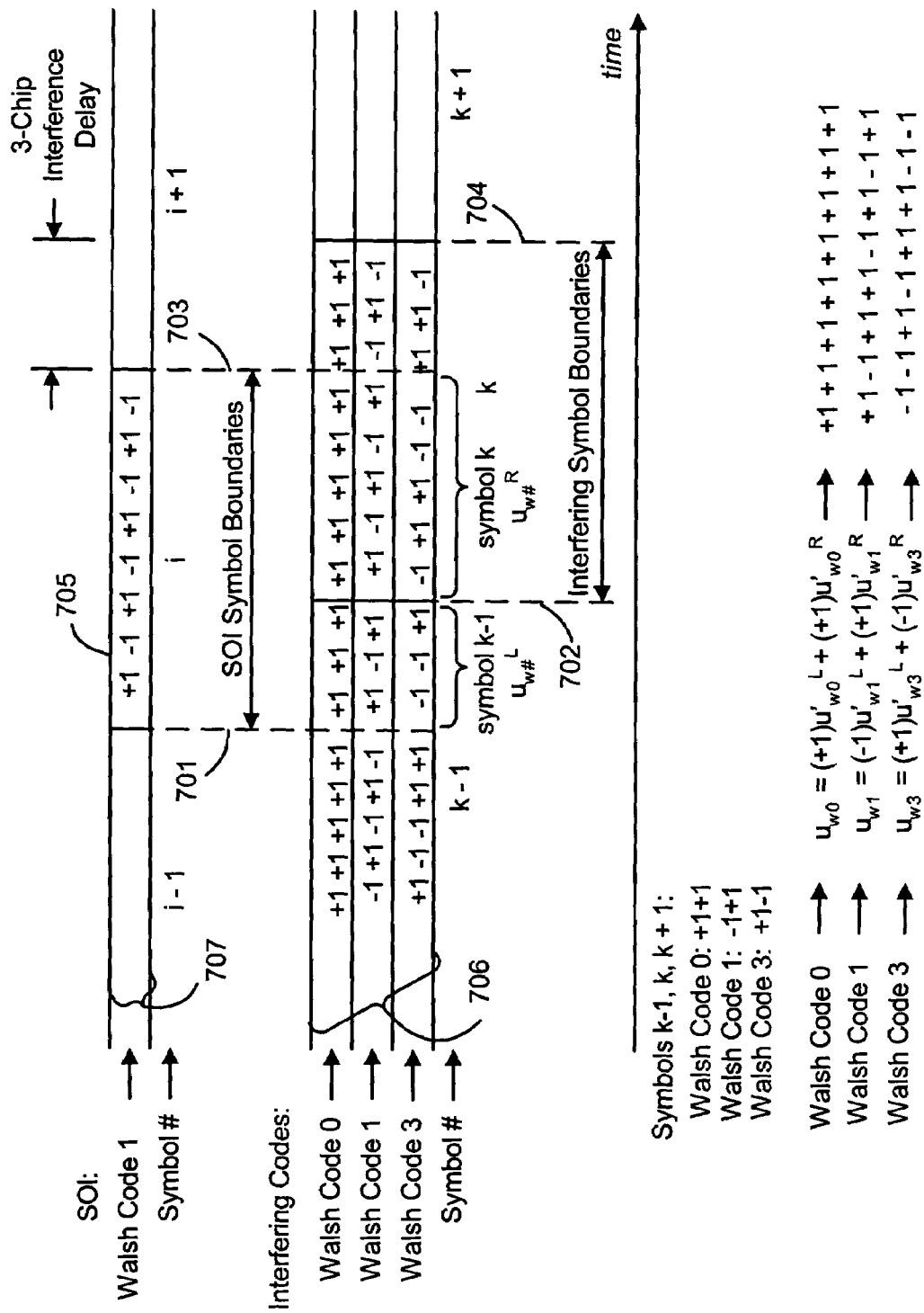
FIG. 7 illustrates an exemplary matrix generation in one embodiment of the invention.

FIG. 7 illustrates an exemplary matrix generation in one embodiment of the invention. More specifically, FIG. 7 illustrates the generation of an interference matrix, such as matrix 203 of FIG. 2, by a matrix generator, such as matrix generator 202 of FIG. 2. Such an interference matrix may be a vector or a multi rank matrix. The matrix described herein may be used in part to produce a cancellation operator, such as that of Eq. 1. In this example, interfering signal 706 is a multipath of signal 707.

In this exemplary embodiment, indices i−1, i and i+1 represent symbols of a selected coded signal coinciding with symbols k−1, k and k+1 of interfering signals selected for cancellation. This embodiment illustrates the use of sign information in the construction of the interference matrix using Walsh codes in a simplified example. The selected interfering signals are shown as Walsh codes 0, 1 and 3. The Walsh codes exemplified herein are derived from a rank 8 Hadamard matrix. Those skilled in the art should readily recognize that the methods described herein can be applied to any length Walsh codes (e.g., 64 and 128 length Walsh codes). Similarly, other covering codes, such as QOFs may be used in an alternative embodiment.

This embodiment depicts matrix generation prior to the application of the spreading code and/or phase estimate. Walsh code 0 is a covering code used for a pilot channel in some CDMA communication systems, such as cdmaOne and cdma2000 systems, wherein the bit sequence of the transmitted coded symbols is a sequence of all +1's. The other illustrated Walsh codes (i.e., Walsh codes 1 and 3) in this embodiment are representative of other channels within a CDMA telephony system. Each of these Walsh codes has sign values corresponding to transmitted symbols. A sign estimator, such as sign estimator 600 of FIG. 6, may be used to estimate the sign of each symbol transmitted so that the sign estimate may be imposed on the elements of the Walsh codes. For example, Walsh code 3 has a particular sequence of "+1" and "−1" chips when a transmitted symbol is "+1"; however, if the transmitted symbol is a "−1", then the sequence of Walsh code 3 is inverted such that all "+1"s in the sequence become "−1"s and all "−1"s become "+1"s. Walsh code 0 is typically used for coherent demodulation of the other channels and as such has a sequence of all "+1"s.

In this example, the Walsh codes of the interfering symbols and the signal of interest (i.e., data 706 and 707, respectively) are illustrated with symbol boundaries 701, 702, 703 and 704. The symbol boundaries 702 and 704 provide demarcation of the symbols of the interfering Walsh codes as they overlap symbols of a selected signal of interest. The interfering multipath is exemplarily illustrated as having a 3 chip delay with respect to the signal path of interest. To the left of boundary 702 is the (k−1)$^{th}$ interfering symbol. Between boundaries 701 and 702 is the portion of the interfering symbol k−1 that interferes with symbol i of the signal of interest.

Between the boundaries 702 and 703 is the portion of the interfering symbol k that interferes with symbol i of the signal of interest. To the right of symbol boundary 704 is the (k+1)$^{th}$ interfering symbol. Each of the interfering symbols is modulated independently and as such has a symbol sign value that is independent of prior and subsequent symbols. In this example, the symbol sign values are Interfering Walsh Code 0 Sign Values: +1, +1
Interfering Walsh Code 1 Sign Values: −1, +1
Interfering Walsh Code 3 Sign Values: +1, −1

Interference vectors are formed from the chip sequences of these interfering codes. For example, $u_{w\#}^L$ represents interference from the Walsh codes overlapping the left portion of the symbol "i" of data 705 (i.e., between symbol boundaries 701 and 702), wherein the "W#" subscript denotes the Walsh code number of the interfering Walsh code. Similarly, $u_{w\#}^R$ represents interference from the Walsh codes overlapping the right most portion of the symbol "i" of data 705 (i.e., between symbol boundaries 702 and 703).

Interference vectors are constructed from the interfering Walsh codes using the left and right overlapping portions (i.e., $u_{w\#}^L$ and $u_{w\#}^R$, respectively) of those interfering unsigned Walsh (i.e., $u'_{w\#}$) codes that overlap data 705. Accordingly, the chips from both the left and right side portions may be multiplied by their respective estimate sign value and combined to form interference vectors $u_{w\#}$ as follows:

$$u_{w0}=(+1)*u'_{w0}{}^L+(+1)*u'_{w0}{}^R=\{+1,+1,+1,+1,+1,+1,+1,+1\}$$

$$u_{w1}=(-1)*u'_{w1}{}^L+(+1)*u'_{w1}{}^R=\{+1,-1,+1,+1,-1,+1,-1,+1\}$$

$$u_{w3}=(+1)*u'_{w3}{}^L+(-1)*u'_{w3}{}^R=\{-1,-1,+1,-1,+1,+1,-1,-1\}.$$

These interference vectors may be multiplied by associated phase estimates and on-time PN codes to construct an interference matrix, such as matrix 203 of FIG. 2. Such phase estimates may be generated by phase estimator 400 described in FIG. 4. These interference vectors are then used to construct the interference matrix and may be used as either row or column vectors of the matrix as a matter of design choice. In the preferred embodiment, as illustrated by Eq. 1, the interference vectors will be column vectors.

While one embodiment of matrix generation has been shown, those skilled in the art should readily recognize that other embodiments may fall within the scope and spirit of the invention. Accordingly, the invention is not intended to be limited to the exemplary embodiment shown herein. Rather, the invention is intended to be limited to the language recited in the claims. Additionally, those skilled in the art should readily recognize Hadamard matrices of various ranks and the Walsh codes that may be derived therefrom may be used. Accordingly, matrix generation is not intended to be limited to the exemplary embodiment of length 8 Walsh codes.

Figure 8:
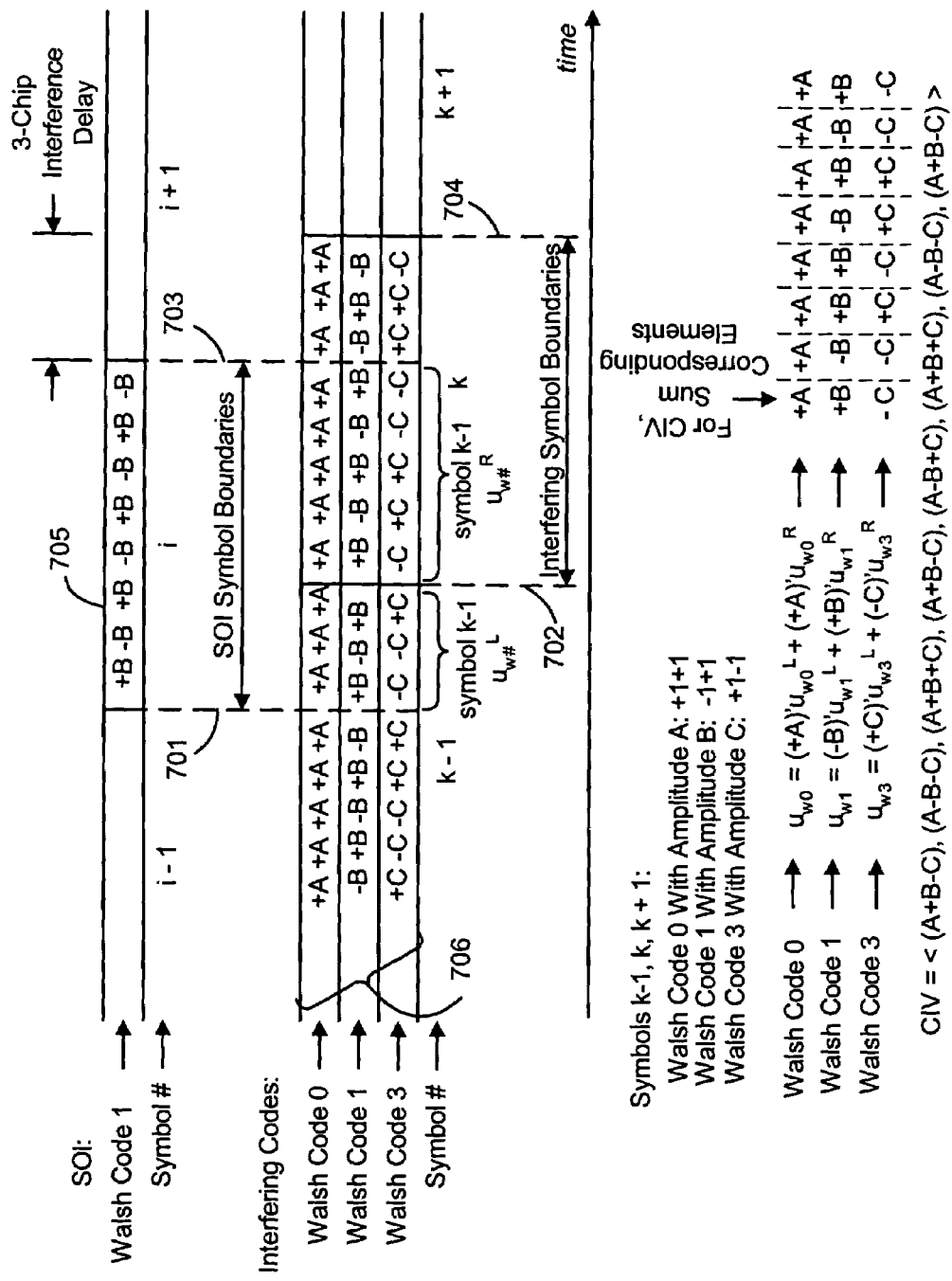
FIG. 8 illustrates another exemplary matrix generation in one embodiment of the invention.

FIG. 8 illustrates another exemplary matrix generation in one embodiment of the invention. In this embodiment, the interfering Walsh codes of FIG. 7 are illustrated and to which the associated received amplitudes are imposed to form the interference matrix, such as matrix 203 of FIG. 2. For example, since each interfering Walsh code is independently modulated, each interfering Walsh code has an independent sign value associated with it. Each channel also has an amplitude value associated with it.

In this exemplary embodiment, the interfering Walsh codes 0, 1 and 3 (i.e., data 706) have associated amplitude values of A, B and C, respectively with sign values dependent on estimated bits transmitted. For simplicity, the magnitude of the estimated amplitude is depicted as constant over multiple symbols. Accordingly, the interference vectors can be constructed as follows:

$$u_{w0} = (+A)*u'_{w0}{}^L + (+A)*u'w0^R = \{+A, +A, +A, +A, +A, +A, +A, +A\}$$

$$u_{w1} = (-B)*u'_{w1}{}^L + (+B)*u'_{w1}{}^R = \{+B, -B, +B, +B, -B, +B, -B, +B\}$$

$$u_{w3} = (+C)*u'_{w3}{}^L + (-C)*u'_{w3}{}^R = \{-C, -C, +C, -C, +C, +C, -C, -C\}.$$

Amplitude estimates with sign such as those described herein can be generated by an amplitude estimator, such as amplitude estimator 500 of FIG. 5.

In one embodiment of the invention, amplitude-scaled interference vectors can be combined to form a composite interference vector. For example, the interference vectors $u_{w0}$, $u_{w1}$ and $u_{w3}$ can have corresponding elements summed using standard vector addition to form a CIV.

Accordingly, the interference vectors $u_{w0}$, $u_{w1}$ and $u_{w3}$ may be used to form a CIV as follows:

$$CIV = <(A+B-C), (A-B-C), (A+B+C), (A+B-C), (A-B+C), (A+B+C), (A-B-C), (A+B-C)>.$$

In this example, the spreading code and/or phase estimate may be imposed on the CIV. However, if the CIV is formed from selected channels from more than one signal path, the spreading codes and/or phase estimates are imposed prior to the summation of vectors. Since composite interference vector construction can reduce the rank of a matrix through its combination of vectors, the CIV may reduce a number of matrix operations when generating the cancellation operator (e.g., according to Eq. 1). For example, the CIV may eliminate the need to calculate a full matrix inverse.

While one embodiment of matrix generation has been shown, those skilled in the art should readily recognize that other embodiments may fall within the scope and spirit of the invention. Accordingly, the invention is not intended to be limited to the exemplary embodiment shown and described herein. Rather, the invention is intended to only be limited by the claims and their equivalents. Additionally, those skilled in the art should readily recognize that sign estimates and/or corresponding amplitude estimates may simply serve as optional information in the construction of interference vectors and subsequently, a cancellation operator. Amplitude estimates and sign estimates may improve interference cancellation.

Figure 9:
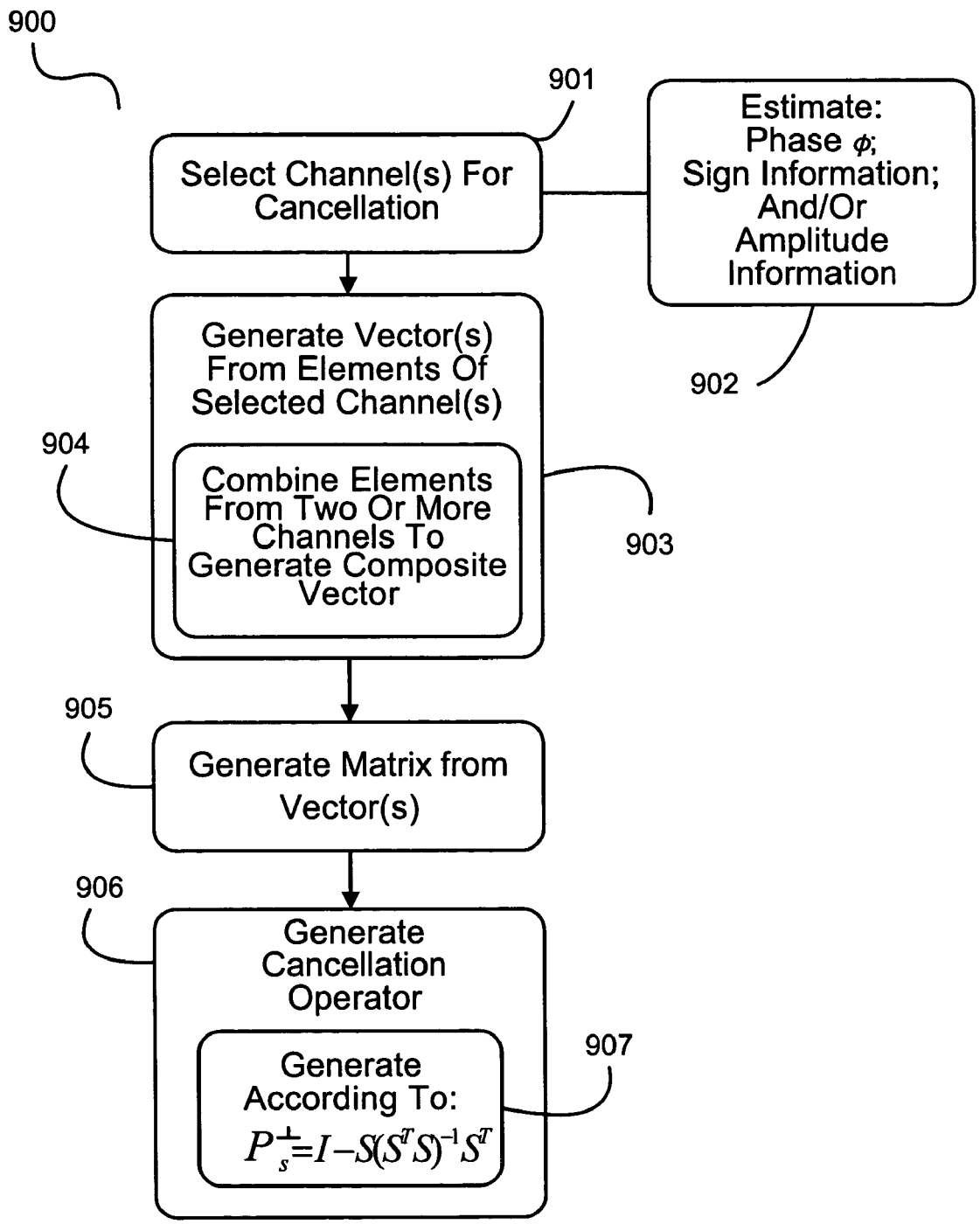
FIG. 9 is a flow chart illustrating one exemplary methodical embodiment of the invention.

FIG. 9 is flow chart 900 illustrating one exemplary methodical embodiment of the invention. In this embodiment, one or more channels are selected for cancellation from a signal in element 901. The channels and their associated signal paths may be selected by an interference selector such as interference selector 201 of FIG. 2. Additionally, phase information, amplitude information (e.g., either relative or absolute amplitude information) and/or sign information may be estimated for use in interference vector construction in element 902. In a preferred embodiment, phase estimation, amplitude information and/or sign information is performed prior to selecting the interfering channels.

Interference vectors are generated from the elements of those interfering channels and signal paths, in element 903. For example, a matrix generator, such as matrix generator 202 of FIG. 2, may construct interference vectors from the elements of the selected interfering channels and signal paths. Phase information, sign information and/or amplitude information may be imposed on the interference vectors. In one embodiment of the invention, the elements of constructed interference vectors are combined to generate a composite interference vector, in element 904.

Once the interference vectors are constructed, an interference matrix may be formed from the interference vectors, in element 905. The interference matrix can thereby be used to generate a cancellation operator, in element 906. For example, the cancellation operator may be a projection operator that is generated according to Eq. 1 in element 907. The cancellation operator, as previously described, can be applied to an input signal to substantially cancel the selected interfering signals.

While one embodiment has been shown and described in detail, those skilled in the art should readily recognize that other embodiments may fall within the scope and spirit of the invention. Accordingly, the invention is not intended to be limited to the specific embodiments shown and described herein. Rather, the invention is only intended to be limited by the language recited in the claims and their equivalents.

The embodiments described herein may substantially reduce interference caused by unwanted signals and improve data recovery. For example, poor signal quality due to interference may deleteriously affect acquisition, tracking and demodulation of selected signals. A reduction of interference may, therefore, result in improved data recovery. In regards to such benefits, the embodiments herein may advantageously require use within a CDMA communication system. Improved processing within a CDMA communication system may be exploited in terms of increased system capacity, increased system coverage, increased data rates and/or reduced transmit power. However, those skilled in the art should readily recognize that the above embodiments should not be limited to any particular type of signaling. For example, the embodiments disclosed herein may be advantageous to systems employing CDMA (e.g., such as cdmaOne and cdma2000), WCDMA, Broadband CDMA, UMTS and/or GPS signals.

Additionally, it should be noted that the above embodiments of the invention may be implemented in a variety of ways. For example, the above embodiments may be implemented from software, firmware, hardware or various combinations thereof. Those skilled in the art are familiar with software, firmware, hardware and their various combinations. To illustrate, those skilled in the art may choose to implement certain aspects of the invention in hardware using ASIC chips, DSPs, Reduced Instruction Set Computers ("RISC"), Advanced RISC Machines and/or other circuitry. Still, some aspects of the invention may be implemented through combinations of software using VHDL, Verilog, Java, C, C++, Matlab, and/or processor specific machine and assembly languages. Accordingly, those skilled in the art should readily recognize that such implementations are a matter of design choice and that the invention should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A system, comprising:
   circuitry, comprising an analog to digital converter configured for converting a received analog signal into a digital signal;
   a processing engine communicatively coupled to the circuitry and comprising an interference selector comprising a signal path selector configured for selecting one or more interfering paths for interference cancellation;
   one or more interference vector constructors coupled to the interference selector configured for constructing one or more interference vectors using at least one of estimated amplitude information, estimated sign information or estimated phase information; and
   a matrix generator communicatively coupled to the at least one or more interference vector constructors and configured for receiving selected said one or more interference vectors from the one or more interference vector constructors and for generating a matrix that is a linear combination of said one or more interference vectors.

2. The system of claim 1, further comprising a processor communicatively coupled to the matrix generator and configured for using the matrix to generate a cancellation operator.

3. The system of claim 2, wherein the cancellation operator substantially comprises the following form:

$$P_s^\perp = I - S(S^T S)^{-1} S^T,$$

where $P_s^\perp$ is the cancellation operator, I is an identity matrix, S is the matrix and $S^T$ is a transpose of the matrix.

4. The system of claim 2, further comprising an applicator configured for applying the cancellation operator to an input signal to substantially cancel the selected said one or more interfering paths from the input signal and to generate a substantially interference cancelled signal.

5. The system of claim 4, wherein the input signal is one of a received digital signal or a reference code.

6. The system of claim 1, wherein the system is configurable with a receiver to provide a substantially interference cancelled received signal to a processing finger of the receiver.

7. The system of claim 6, wherein the receiver is configurable with a base station or a handset.

8. The system of claim 1, wherein the system further comprises a phase estimator configured for estimating phase information of the one or more interfering paths for application to the elements of the one or more interference vectors, wherein each interference vector has a phase estimate imposed thereon.

9. The system of claim 1, wherein the system further comprises a sign detector configured for detecting sign information of one or more interferers for application to the elements of the one or more interference vectors.

10. The system of claim 1, wherein the system further comprises an amplitude estimator configured for estimating amplitude information of one or more interferers for application to the elements of the one or more interference vectors.

11. The system of claim 10, wherein the estimated amplitude information is estimated relative amplitude information.

12. The system of claim 10, wherein the estimated amplitude information is estimated absolute amplitude information.

13. The system of claim 1, wherein the interference selector is further configured for selecting one or more interferers based upon a threshold.

14. The system of claim 1, wherein the interference selector is further configured for selecting the one or more interferers based upon a predetermined number.

15. The system of claim 1, wherein at least one of the vectors comprises a nominal length number of elements.

16. The system of claim 15, wherein the elements comprise covering code elements and spreading code elements.

17. The system of claim 16, wherein the elements further comprise estimated phase elements.

18. The system of claim 1, wherein the matrix generator is further configured for summing at least two of the one or more interference vectors to generate a composite vector.

19. The system of claim 1, wherein the signal path selector is further configured for transferring tracking information for the one or more selected interfering paths to the interference vector constructor.

20. The system of claim 19, wherein the interference selector further comprises a channel selector communicatively coupled to the signal path selector and configured for selecting one or more channels for channel cancellation from one or more signal paths.

21. The system of claim 1, wherein at least one of the vectors comprises elements from a sub-symbol, a single symbol or multiple symbols.

22. The system of claim 1, wherein the system is configurable as an Application Specific Integrated Circuit.

23. The system of claim 1, wherein the system is configurable as a Digital Signal Processor.

24. The system of claim 1, wherein the system is configurable as a Field Programmable Gate Array.

25. The system of claim 1, wherein the system is configurable as an Advanced RISC Machine.

26. The system of claim 1, wherein the system is configurable with a handset.

27. A receiver, comprising:
   circuitry, comprising an analog to digital converter configured for converting a received analog signal into a digital signal;
   a processing engine communicatively coupled to the circuitry and comprising
   a phase estimator configured to compute the phase of at least one digital signal;
   an amplitude estimator configured to compute the amplitude of at least one channel in said digital signal; and
   a processing engine configured to compute a composite interference vector computed from a linear combination of one or more interference vectors, wherein the one or more interference vectors is computed using at least one of estimated amplitude information, estimated phase information, and estimated sign information and wherein the composite interference vector is used to substantially remove interference from a received signal or a reference signal.

28. The receiver of claim 27, wherein the estimated phase information is derived using a channel.

29. A receiver, comprising:
   circuitry, comprising an analog to digital converter configured for converting a received analog signal into a digital signal;
   a processing engine communicatively coupled to the circuitry and comprising
      a signal path selector configured for selecting one or more interfering signal paths for cancellation,
      at least one interference vector constructor coupled to the signal path selector configured for constructing one or more interference vectors using at least one of estimated amplitude information, estimated sign information or estimated phase information; and
      a matrix generator communicatively coupled to the at least one interference vector constructor and configured for generating a matrix that is a linear combination of the one or more interference vectors, wherein the matrix is used to generate a cancellation operator that substantially cancels said one or more interfering signal paths from the digital signal.

30. The receiver of claim 29, wherein the receiver is configurable within a base station or a handset.

31. The receiver of claim 29, wherein the selected said one or more interfering signal paths comprise a Code Division Multiple Access signal.

32. The receiver of claim 29, wherein the selected said one or more interfering signal paths comprise a Wideband Code Division Multiple Access signal.

33. The receiver of claim 29, wherein the selected said one or more interfering signal paths comprise a Global Positioning System signal.

34. The receiver of claim 29, wherein the selected said one or more interfering signal paths comprise a Universal Mobile Telephone Service signal.

35. The receiver of claim 29, wherein at least one of the selected said one or more interfering signal paths comprises a signal path and wherein the interference selector comprises a path selector configured for selecting one or more signal paths from the selected said one or more interfering signals.

36. The receiver of claim 35, wherein the interference selector further comprises a channel selector communicatively coupled to the path selector and configured for selecting one or more channels for cancellation from selected said one or more signal paths.

37. A method, comprising:
   selecting in a receiver one or more signal paths for cancellation from a received signal;
   generating in a processor at least one interference vector using at least one of estimated amplitude information, estimates sign information, code information and phase information for each of said one or more signal paths; and
   generating a matrix that is a linear combination of one or more said interference vectors, wherein the matrix is used for generating a cancellation operator.

38. The method of claim 37, further comprising generating the cancellation operator from the matrix, wherein the cancellation operator is used to substantially cancel interference from an input signal.

39. The method of claim 38, wherein the received signal is one of a received digital signal or a reference code.

40. The method of claim 38, wherein said generating the cancellation operator substantially comprises generating the cancellation operator according to the following form:

$$P_s^\perp = I - S(S^T S)^{-1} S^T,$$

where $P_s^\perp$ is the cancellation operator, I is an identity matrix, S is the matrix and $S^T$ is a transpose of the matrix.

41. The method of claim 37, wherein said generating a matrix comprises summing two or more interference vectors to form a composite interference vector.

42. The method of claim 37, further comprising estimating phase of at least a first signal path.

43. The method of claim 37, further comprising estimating a relative amplitude or an absolute amplitude of one or more channels.

44. The method of claim 37, further comprising estimating a sign of said at least one selected said one or more channels in response to selecting the one or more channels.

45. The method of claim 44, wherein the sign of said at least one selected said one or more channels is the sign of a symbol.

46. The method of claim 37, further comprising selecting one or more channels for cancellation from a second signal path in response to selecting the one or more channels for cancellation from the first signal path.

47. The method of claim 46, further comprising estimating phase of the second signal path.

48. The method of claim 47, further comprising imposing the estimated phase on vector elements associated with the second signal path.

49. The method of claim 46, further comprising estimating a relative amplitude or an absolute amplitude of selected said one or more channels from the second signal path in response to selecting the one or more channels for cancellation.

50. The method of claim 49, further comprising imposing the relative amplitude or the absolute amplitude on the vector elements of said at least one vector.

51. A system, comprising:
   means for selecting in a receiver one or more signal paths for cancellation from a set of received signal paths;
   means for generating in a processor at least one interference vector comprising elements from at least one selected said one or more signal paths using at least one of estimated amplitude information, estimated sign information and estimates phase information; and
   means for generating a matrix from said at least one interference vector that is a linear combination of one or more interference vectors, wherein the matrix is used for generating a cancellation operator.

52. The system of claim 51, further comprising means for generating a cancellation operator from the matrix, wherein the cancellation operator is used to substantially cancel the selected said one or more signal paths from an input signal.

53. The system of claim 52, wherein the input signal is one of a received digital signal or a reference code.

54. The system of claim 52, wherein the means for generating the cancellation operator substantially comprises means for generating the cancellation operator according to the following form:

$$P_s^\perp = I - S(S^T S)^{-1} S^T,$$

where $P_s^\perp$ is the cancellation operator, I is an identity matrix, S is the matrix and $S^T$ is a transpose of the matrix.

55. The system of claim 51, wherein the means for generating said at least one interference vector comprises means for generating said at least one interference vector from elements of two or more selected channels to generate the interference vector.

56. The system of claim 51, further comprising means for estimating phase of one or more signal paths.

57. The system of claim 51, further comprising means for estimating a relative amplitude or an absolute amplitude of one or more channels.

58. The system of claim 51, further comprising means for estimating a sign of one or more channels.

59. The system of claim 58, wherein the sign of said at least one selected said one or more channels is the sign of a symbol.

60. The system of claim 51, further comprising means for selecting one or more channels for cancellation of a second signal path in response to selecting the one or more channels from the second signal path.

61. The system of claim 60, further comprising means for estimating phase of the second signal path.

62. The system of claim 61, further comprising means for imposing the estimated phase on elements associated with the second signal path.

63. The system of claim 60, further comprising means for estimating a relative amplitude or an absolute amplitude of selected said one or more channels from the second signal path in response to selecting the one or more channels for cancellation.

64. The system of claim 63, further comprising means for imposing the relative amplitude or the absolute amplitude on the elements of said at least one interference vector.

65. The system of claim 60, further comprising means for estimating sign information associated with each symbol of selected said one or more channels from the second signal path in response to selecting the one or more channels for cancellation.

66. The system of claim 65, further comprising means for imposing the sign information on the elements of said at least one interference vector.

* * * * *